US006921248B2

United States Patent
Almeras

(10) Patent No.: US 6,921,248 B2
(45) Date of Patent: Jul. 26, 2005

(54) SYSTEM FOR CONTROLLING THE TORSIONAL STABILITY OF THE DRIVETRAIN OF A MACHINE, IN PARTICULAR OF A HELICOPTER

(75) Inventor: Philippe Almeras, Salon de Provence (FR)

(73) Assignee: Eurocopter, Marignane Cedex (FR)

(*) Notice: Subject to any disclaimer, the term of this patent is extended or adjusted under 35 U.S.C. 154(b) by 30 days.

(21) Appl. No.: 10/628,428

(22) Filed: Jul. 29, 2003

(65) Prior Publication Data

US 2004/0035978 A1 Feb. 26, 2004

(30) Foreign Application Priority Data

Aug. 26, 2002 (FR) .......................................... 02 10563

(51) Int. Cl.[7] .............................................. B64C 27/12
(52) U.S. Cl. .......................................... 416/35; 416/44
(58) Field of Search ............................. 416/35, 44, 31, 416/500

(56) References Cited

U.S. PATENT DOCUMENTS

| 3,954,229 | A | | 5/1976 | Wilson |
| 4,267,496 | A | * | 5/1981 | Ivanov et al. ................ 318/615 |
| 4,453,378 | A | | 6/1984 | Zagranski et al. |
| 5,895,012 | A | | 4/1999 | Krysinski et al. |
| 2002/0065139 | A1 | | 5/2002 | Krysinski et al. |

FOREIGN PATENT DOCUMENTS

| FR | 2817234 | 5/2002 |
| GB | 908443 | 11/1962 |
| GB | 2131979 | 6/1984 |

OTHER PUBLICATIONS

Search Report dated Jan. 12, 2004.
Preliminary Search Report dated Jul. 2, 2003.

* cited by examiner

Primary Examiner—Edward K. Look
Assistant Examiner—Richard A. Edgar
(74) Attorney, Agent, or Firm—Stevens, Davis, Miller & Mosher, LLP

(57) ABSTRACT

System for controlling the torsional stability of the drivetrain of a machine, in particular of a helicopter.

Figure 1:
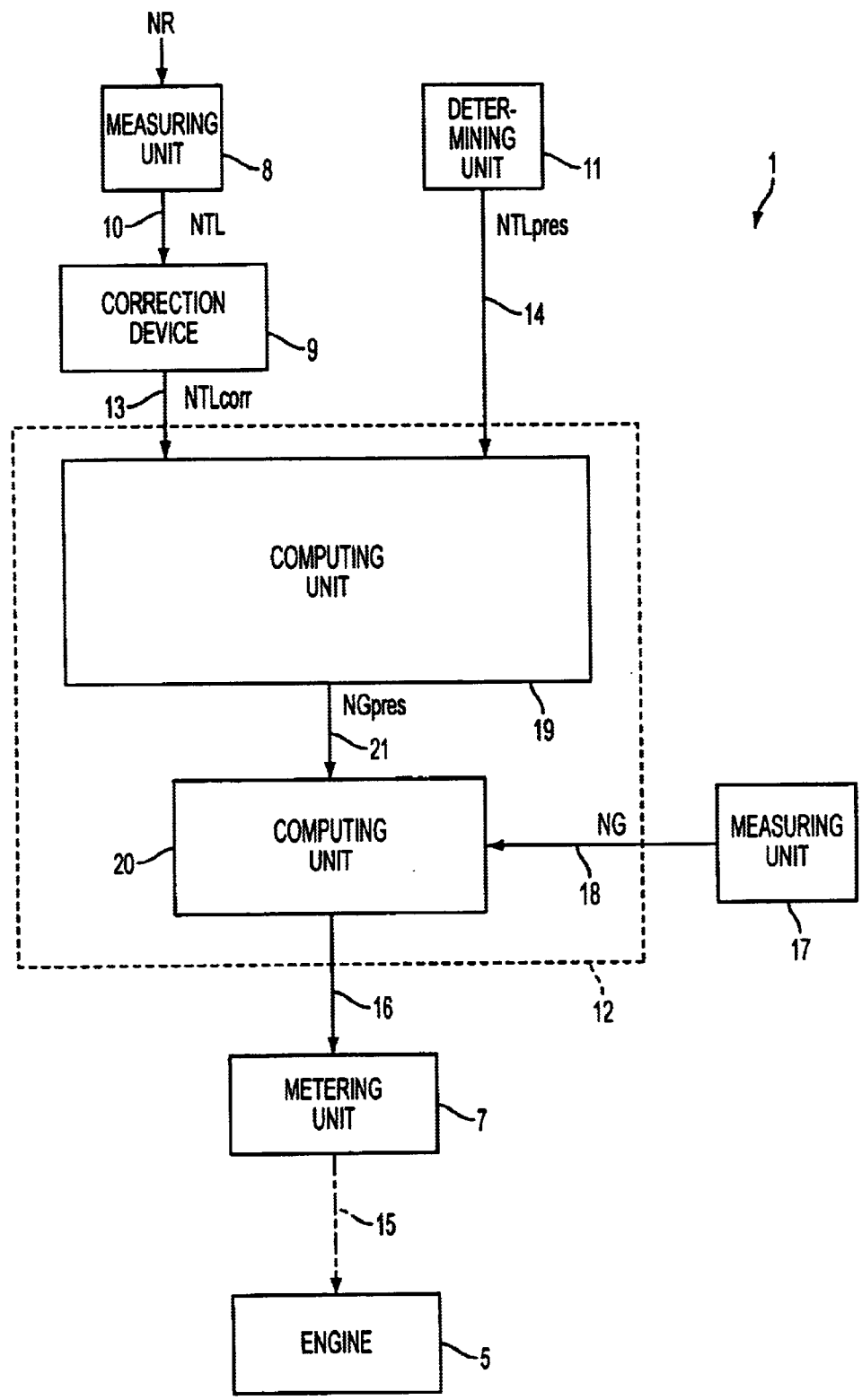

The system (1) comprises a means (7) for acting on the speed of an engine (5) of the power train of the machine, a means (8) for measuring a speed NTL of rotation of the free turbine of the engine (5), a correction device (9) for correcting the measured speed NTL into a corrected value NTLcorr, a means (11) for determining a preset value NTLpres of the speed of rotation of the free turbine of the engine (5), and a a computation unit (12) for automatically computing, on the basis of the preset value NTLpres and of the corrected value NTLcorr, operating commands which are applied automatically to the first means (7). The correction device (9) corrects the measured speed NTL so as to obtain a corrected value NTLcorr exhibiting, at least around the first torsional mode of the drivetrain, the same modulus and an opposite phase with respect to the preset value NTLpres.

8 Claims, 2 Drawing Sheets

SYSTEM FOR CONTROLLING THE TORSIONAL STABILITY OF THE DRIVETRAIN OF A MACHINE, IN PARTICULAR OF A HELICOPTER

The present invention relates to a system for controlling the torsional stability of the drivetrain of a machine, in particular of a helicopter.

Although not exclusively, the present invention applies more particularly to a helicopter, whose drivetrain comprises, in a known manner, at least:
  a main rotor for lift and forward motion;
  an anti-torque tail rotor; and
  gearboxes and associated shafts,
said drivetrain being driven by at least one engine providing the motive energy required for driving said main and tail rotors. The assembly composed of the drivetrain and of the engine or engines constitutes the power train of the helicopter.

It is known that, under certain flight conditions of the helicopter, the natural modes of its drivetrain may be coupled to those of the fuselage, in particular through the variation of the rotor speed and through the yawing motion of the fuselage, in such a way as to engender resonance phenomena liable to cause considerable vibrations of the drivetrain. Such vibrations are liable to render the thus-coupled assembly unstable or difficult to control. In a known manner, said coupling may in particular be caused by the regulating of the engine or by the lack of damping at the rotor level, or even by the influence of the control system, such as the automatic pilot or, as the case may be, the helicopter's electric or optical flight controls.

It is known moreover that the most adverse vibrations as regards the stabilization of the drivetrain and the piloting of the helicopter are due to the first torsional mode of the drivetrain, for which mode the motion of the blades of the main rotor is in phase opposition with that of the main gearbox of the drivetrain.

It will additionally be noted that the effect of the aforesaid adverse vibrations is generally larger when the rotors of the helicopter are fitted with so-called "interblade" drag adapters, corresponding to blade dampers mounted, not on each occasion between a blade and the mast of the rotor, but directly between two adjacent blades. Specifically, in this case:
the frequency of the first torsional mode of the drivetrain lies near the piloting frequencies, for which the regulation of the engine exhibits large gains; and
the rotor lacks damping as regards the in-phase motion of the blades, since in this case the drag adapter acts only on the differential motion of the adjacent blades.

To remedy these drawbacks, a known solution makes provision to modify the system for regulating the engine or engines of the helicopter in such a way as to reduce the gain of the regulation of this or these engines.

To do this, said regulating system comprises:
a first means for acting on said speed, as a function of operating commands;
a second means for measuring a speed NTL corresponding to the speed of rotation of the free turbine of said engine;
a correction or filtering device for correcting or filtering said measured speed NTL into a filtered value NTLfiltered;
a third means for determining a preset value NTLpres corresponding to the preset value for the speed of rotation of the free turbine of the engine; and
computing means for automatically computing, on the basis of said preset value NTLpres and of said filtered value NTLfiltered, operating commands which are applied automatically to said first means.

Said filtering device carries out a standard low-pass filtering, the object of which is to attenuate the regulation gain so as to improve stability. It is known that, through such attenuation, the response curve is translated globally downward (that is to say decreased in value), but it retains its initial shape.

This solution is not however satisfactory, in particular for high-tonnage helicopters, since, during flight, large gains in the regulating of the engine are often necessary, in particular to obtain good pickups.

Low-pass filtering decreases the passband of the system. If its cutoff frequency is too low, it will have the (harmful) effect of decreasing the pickups of the engine, that is to say its capacity to respond to fast alterations in the preset value NTLpres.

Moreover, filtering which is too weak (insufficient attenuation of the gain) could cause divergence of the output.

The object of the present invention is to remedy these drawbacks. It relates to a system making it possible to control the torsional stability of the drivetrain of a machine, in particular of a helicopter, without attenuating the gain.

For this purpose, according to the invention, said system making it possible to regulate the speed of at least one engine of said drivetrain and comprising at least:
a first means for acting on said speed, as a function of operating commands;
a second means for measuring a speed NTL corresponding to the speed of rotation of the free turbine of said engine;
a correction device for correcting said measured speed NTL into a corrected value NTLcorr;
a third means for determining a preset value NTLpres corresponding to the preset value for the speed of rotation of the free turbine of the engine; and
a computation unit for automatically computing, on the basis of said preset value NTLpres and of said corrected value NTLcorr, operating commands which are applied automatically to said first means,
is noteworthy in that said correction device implements a correction law which corrects said measured speed NTL to obtain a corrected value NTLcorr exhibiting, at least in a frequency domain situated around at least the first torsional mode of said drivetrain, the same modulus as said preset value NTLpres and a phase which is opposite to the phase of said preset value NTLpres in such a way as to damp at least said first torsional mode of the drivetrain.

In contradistinction to the filtering of the measured speed NTL implemented in standard regulation, neither the objective nor the effect of this correction law is to attenuate the gain so as to improve stability. Said correction law in fact acts essentially on the phase, within the frequency domain where this is necessary, thereby making it possible to preserve the gain. Thus, this correction law affords a dual advantageous effect:
at low frequency, on the pickups of the engine or engines (standard effect); and
at the frequency of the first torsional mode of the drivetrain, on the damping of this mode (added new effect).

The concepts of attenuation (implemented by the aforesaid standard filtering device) and of damping (obtained by virtue of the present invention) should for this purpose be clearly distinguished. During attenuation of the gain, the response curve is translated globally downward, but retains its initial shape. An attenuated resonance peak therefore exhibits a lower absolute value than initially, but still remains as pronounced with respect to the entire response curve. On the other hand, during damping, a damped response peak is decreased (or smoothed) with respect to the remainder of the response curve which retains its initial level (that is to say exhibits an unchanged gain).

It will moreover be noted that the state of the art is based exclusively on the filtering of modes such that the official regulations, via ARP 704 ("Aerospace Recommended Practice"), specify stability criteria which, in fact, impose solutions based on filtering. Specifically, ARP 704 requires that the resonance peaks corresponding to the torsional modes be attenuated by −6 dB, in addition to the usual criteria regarding gain margins and phase margins.

By virtue of the present invention, at least the following advantages are obtained:

the natural damping (that is to say without servoassistance) of the first or of the first few torsional modes of the drivetrain is sharply increased. The sensitivity of these modes is completely reduced;

the absence of filtering affords a relative benefit in gain with regard to the torsional modes, hence a phase advance (with respect to a standard filtering technique);

the aforesaid two advantages combined make it possible to recover very large margins of stability and hence to increase the regulating gains so as to sharply improve the pickups of the engine or engines. Likewise, the absence of any phase delay in the servoassistance improves the control of the engine or engines;

the passband of the regulation is not curtailed. It is therefore sharply increased with respect to the standard technique; and the system in accordance with the invention is simple (to embody and to implement) and inexpensive.

Advantageously, said correction device corrects said measured speed NTL to obtain a corrected value NTLcorr which exhibits the same modulus as said preset value NTLpres and a phase which is opposite to the phase of said preset value NTLpres, in frequency domains situated around a number n of torsional modes of said drivetrain, preferably the first n torsional modes, n being an integer greater than 1.

In a preferred embodiment, said computation unit and said correction device are incorporated into one and the same digital computer, preferably of FADEC type (standing for "Full Authority Digital Engine Computer"). In this case, in order to implement the present invention, it is sufficient to modify the programming of said computer, that is to say of the existing regulating system, so that the implementation of the present invention is then much less expensive.

In another embodiment:

said correction device is an independent computer; or said correction device is an at least partially mechanical means, for example of hydromechanical or electromechanical type.

The present invention also relates to a process for determining the correction law implemented by the correction device of the aforesaid system it accordance with the invention.

To do this, according to the invention, the following operations are carried out in succession:

a) a simulation model of the power train (composed of the drivetrain and at least one engine of the machine) is formulated theoretically, making it possible to compute a first transfer function for transferring between the free turbine's speed of rotation, which is filtered with the aid of a predetermined filter, and said preset value NTLpres (this first closed-loop transfer function resulting from the placing in parallel of the respective transfer functions of the power train and of the filter);

b) said power train is operated while parameters making it possible to tune said first transfer function are measured;

c) an open-loop transfer function is determined by placing the thus-tuned transfer function of said power train and the transfer function of said filter in series;

d) the transfer function of said filter is subtracted from said open-loop transfer function; and e) a corrector is formulated as replacement for said filter, so as to obtain a correction transfer function which is such that the overall transfer obtained by the placing of the latter function and of the transfer function of the power train in series represents said correction law.

Advantageously, an increase in the gains is moreover effected on said correction law.

The figures of the appended drawing will elucidate the manner in which the invention may be embodied. In these figures, identical references designate similar elements.

FIG. 1 is the schematic diagram of a control system in accordance with the invention.

Figure 2:
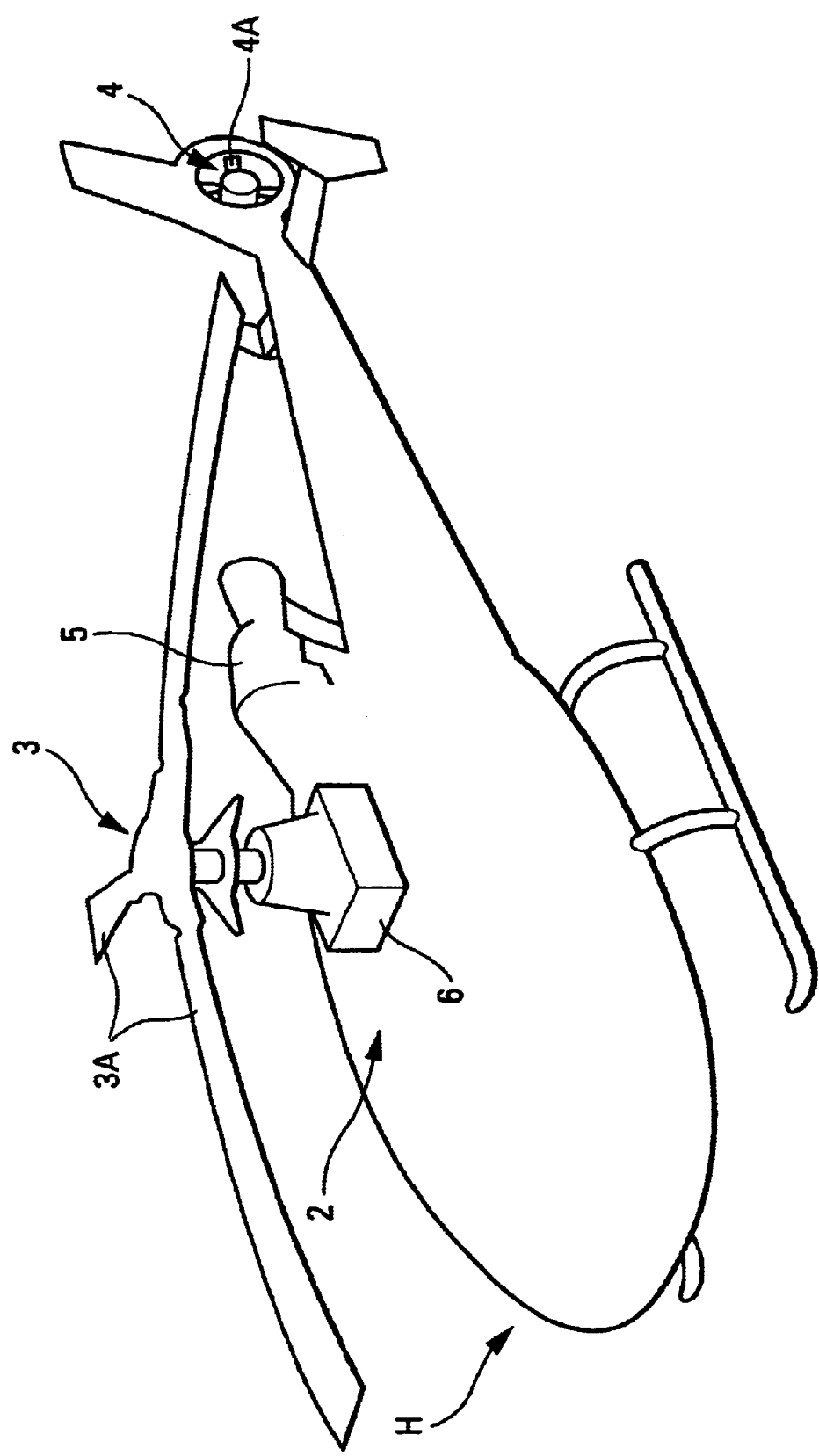

FIG. 2 diagrammatically illustrates a helicopter to which a control system in accordance with the invention is applied.

The system 1 in accordance with the invention and represented diagrammatically in FIG. 1 is intended for controlling the torsional stability of the drivetrain 2 of a machine, in particular of a helicopter H.

In a known manner, the drivetrain 2 of a helicopter H comprises at least the following elements, as represented in FIG. 2:

a main rotor 3 for lift and forward motion of the helicopter H, fitted with blades 3A; and a tail rotor 4 intended to counter the torque of said main rotor 3, which is fitted with blades 4A; and gearboxes, of which only the main gearbox 6 has been represented (diagrammatically) in FIG. 2, and associated shafts (not represented).

Said system 1 is intended for regulating the speed of the engine or engines 5 supplying the motive energy necessary for driving said rotors 3 and 4 and for this purpose comprises:

a first means 7 for acting on said speed, as a function of operating commands;

a second means 8 for measuring a speed NTL corresponding to the speed of rotation of the free turbine of said engine 5. This second means 8 can, for example, measure the rotor speed NR and compute the speed NTL from the expression NTL=kNR, k being a known coefficient, since the rotor is tied mechanically to the free turbine;

a correction device 9 which is connected by a link 10 to said second means 8 for correcting said measured speed NTL into a corrected value NTLcorr;

a third means 11 for determining a preset value NTLpres corresponding to the preset value for the speed of rotation of the free turbine of the engine 5; and a computation unit 12 which is connected by links 13 and 14 respectively to said correction device 9 and to said third means 11 for automatically computing, on the basis of said preset value NTLpres and of said corrected value NTLcorr, operating commands which are applied automatically to said first means 7.

Said means 7, 8 and 11 are known standard means.

In a preferred embodiment:

said first means 7 comprises at least one metering valve, of standard type, for metering, as illustrated diagrammatically by a chain-dotted link 15, the fuel which is supplied to the engine 5, as a function of operating commands received via a link 16;

said computation unit 12 computes operating commands making it possible to servocontrol (knowing the speed NG which corresponds to the speed of the gas generator of the engine 5 and which is measured by a standard means 17 connected by a link 18 to the computation unit 12) the speed of the gas generator of said engine 5 to a preset value NGpres of said speed of the gas generator, which depends on said corrected value NTLcorr and on said preset value NTLpres;

said computation unit 12 comprises, for this purpose, a computing means 19 which determines said preset value NGpres of the speed of the gas generator of the engine 5, and a computing means 20 which determines the operating commands for the metering valve 7, on the basis of said preset value NGpres which is received from said computing means 19 via a link 21.

According to the invention, said correction device 9 implements a correction law which corrects said measured speed NTL so as to obtain a corrected value NTLcorr exhibiting, at least in a frequency domain situated around at least the first torsional mode of said drivetrain 2 (but preferably in a plurality of n frequency domains situated around a number n of torsional modes of said drivetrain 2, n being an integer greater than 1), the same modulus as said preset value NTLpres and a phase which is opposite to the phase of said preset value NTLpres in such a way as to damp at least said first torsional mode of the drivetrain 2.

Thus, by virtue of the present invention, at least the following advantages are obtained:

the natural damping (that is to say without servoassistance of the first or of the first few torsional modes of the drivetrain is sharply increased. The sensitivity of these modes is completely reduced;

the absence of filtering affords a relative benefit in gain with regard to the torsional modes, hence a phase advance (with respect to a standard filtering technique);

the above two advantages combined make it possible to recover very large margins of stability and hence to increase the regulating gains so as to sharply improve the pickups of the engine or engines 5. Likewise, the absence of any phase delay in the servoassistance improves the control of the engine or engines 5;

the passband of the regulation is no longer curtailed, and is sharply increased with respect to the standard technique; and the system 1 in accordance with the invention is simple and inexpensive.

It will be noted that in contradistinction to the filtering of the measured speed NTL implemented in standard regulation, neither the objective nor the effect of the correction law according to the present invention is to attenuate the gain so as to improve stability. Said correction law in fact acts essentially on the phase, within the frequency domain where this is necessary (in proximity to the torsional modes of the drivetrain 2), thereby making it possible to keep the gain. Thus, this correction law affords a dual advantageous effect, namely:

at low frequency, on the pickups of the engine or engines 5 (standard effect); and at least at the frequency of the first torsional mode of the drivetrain 2, on the damping of this mode (added new effect).

In a preferred embodiment, said computation unit 12 and said correction device 9 are incorporated into one and the same digital computer, preferably of FADEC type (standing for "Full Authority Digital Engine Computer"). In this case, in order to implement the present invention, it is sufficient to modify the programming of said existing FADEC computer, so that the implementation of the present invention is then much less expensive.

In another embodiment:

said correction device 9 is an independent computer; or
said correction device 9 is an at least partially mechanical means, for example of hydromechanical or electromechanical type.

Additionally, according to the present invention, in order to determine the correction law implemented by the correction device 9 of the system 1, at least the following operations are carried out in succession:

a) a simulation model of the power train (composed of said drivetrain 2 and the engine or engines 5) is formulated theoretically, making it possible to compute a first transfer function HA for transferring between the free turbine's speed of rotation, which is filtered with the aid of a predetermined filter, and said preset value NTLpres (this first closed-loop transfer function resulting from the placing in parallel of the respective transfer functions of the power train and of the filter);

b) said power train is operated while parameters making it possible to tune said first transfer function are measured;

c) an open-loop transfer function is determined by placing the thus-tuned transfer function of the power train and the transfer function of said filter in series;

d) the transfer function of said filter is subtracted from said open-loop transfer function; and e) a corrector is formulated as replacement for said filter, so as to obtain a correction transfer function which is such that the overall transfer obtained by the placing of the latter function and of the transfer function of the power train in series represents said correction law.

More precisely, in the aforesaid step a):

a coupled simulation model of the engine 5 and of the drivetrain 2 is formulated. This model may be similar to that advocated in ARP standard 704. The model of the engine is obtained from parametric tables arising from trials of the engine 5 on a test rig. The model of the drivetrain 2 is obtained on the basis of computed values of inertia and of stiffness of the shafts in torsion, as well as of dynamic parameters of the rotors 3 and 4. This coupled model makes it possible to compute the first transfer function $$HA = \frac{NTLfiltered}{NTLpres},$$

that is say the ratio of the filtered speed of rotation of the free turbine to the preset value of the speed of rotation of the free turbine;

next, a standard regulation is formulated making it possible for the power train identification flights to be performed safely. Through modeling, characteristics of standard regulation that are tailored to the machine H are established. Specifically, the principles of automatic control are then applied whilst complying, for the open-loop transfer function $$HA = \frac{NTLfiltered}{NTLpres},$$

with the following stability margin criteria:

6 dB of gain margin; and
45° of phase margin.

Additionally, the flight performed in step b) is aimed at tuning the complete model of the power train. In this train, two elements (the engine model and the filter) are known perfectly. Only the simulation model for the drivetrain 2 remains theoretical and must therefore be tuned through an in-flight measurement of the characteristics of the train.

In the great majority of cases this flight causes no problems (in particular safety problems), since the measurement of the speed NTL is filtered in standard fashion, the regulation operating in closed loop.

The identification of the characteristics of the drivetrain is performed as follows:

for a given power NG and a given rotor speed NR, a modulated excitation is injected onto the collective pitch control throughout the frequency span of the passband of the fuel metering valve 7. The alterations in the speed NTL are then recorded;

this identification is repeated so as to cover the entire power span NG and the entire rotor speed span NR (even if it is low) and with at least two different levels of excitation so as to identify and quantify the linearity defects.

From this is then deduced a "speed NTL/collective pitch of the main rotor 3" helicopter transfer, as well as its possible variations. In the same way, the trial makes it possible to measure the transfer function $$HA = \frac{NTLfiltered}{NTLpres}$$

described above and, by comparing this measurement with the theoretical computations, to estimate the representativity of the model and to correct it if necessary. This computation/measurement comparison is made on the basis of the closed-loop transfer function $$HA = \frac{NTLfiltered}{NTLpres}.$$

This allows accurate tuning of the simulation model.

Regarding the aforesaid step c) of the process in accordance with the invention, it will be noted that the method of opening the NTL loop by computation makes it possible to avoid carrying out the identification trial in a "fixed fuel metering valve 7" configuration, which could pose considerable safety problems. Use is made of the tuned model for which it is easy to compute the open-loop transfer function $$\frac{NTLfiltered}{NTLpres}.$$

The opening of the loop consists in computing the transfer resulting from the placing of the two transfer functions (power train and filter) in series although they are in parallel when the loop is closed.

On the basis of the tuned model of the drivetrain, obtained in step d), a corrector is formulated in step e) as replacement for the filter. The objective of the corrector is to carry out, at the frequency (and in the vicinity) at least of the first torsional mode of the drivetrain 2, a correction at the loop output NTL which makes it possible, when the loop is closed, to cancel out the excitation introduced on the input NTLpres. To obtain this result, it is necessary and sufficient for the value NTLcorr to have the same modulus and an opposite phase with respect to the excitation introduced as NTLpres, and for this to be so at the frequency of the first torsional mode, as indicated previously.

The overall transfer is obtained by placing the "power train" and "corrector" transfer functions in series. With standard computation rules, one therefore determines the "corrector" transfer function which, placed in series with the "power train" transfer function, gives a signal NTLcorrected having a modulus equal to that of NTLpres and an opposite phase. The corrector thus formulated has the effect, when the loop is closed, of canceling out the dynamic disturbances at least at the frequency of the first torsional mode on the drivetrain 2.

An increase in the gains may possibly also be effected on said correction law.

Additionally, a second flight, for example with the corrector (thus determined) which is programmed into the correction device 9, for example of digital type (in particular a FADEC), makes it possible to verify the proper behavior of the regulation and the expected improvements, namely:

very considerable stability of the torsion train;

low-frequency dynamics in the rotating shafts almost eliminated; and improved pickups of the engine or engines 5.

What is claimed is:

1. A real-time process for controlling the torsional stability of a drivetrain of a helicopter, said helicopter comprising at least a power train including the drivetrain, with a main rotor, an anti-torque rotor as well as gearboxes and associated shafts, and an engine with a free turbine which provides motive energy for driving said main rotor and tail rotor of the drivetrain, the helicopter comprising a system to regulate the speed of the turbine engine and comprising at least;

a first means for acting on maid speed as a function of operating commands;

a second means fox measuring a speed NTL corresponding to the speed of rotation of the free turbine of said engine;

a correction device for correcting said measured speed NTL into a corrected value NTLcorr;

third means for determining a preset value NTLpres corresponding to the preset value for the speed of rotation of the free turbine of the engine; and a computation unit for automatically computing, on the basis of said preset value NTLpres and of said corrected value NTLcorr, the operating commands which are applied automatically to said first means, wherein:

said correction device implements a correction law which corrects said measured speed NTL to obtain, based upon the measured speed NTL of rotation of the free turbine of said engine by the second means, the corrected value NTLcorr exhibiting, at least in a frequency domain situated around at least a first torsional mode of said drivetrain, the same modulus as said preset value NTLpres and a phase which is opposite to the phase of said preset value NTLpres in such a way as to damp at least said first torsional mode of the drivetrain.

2. A process for determining the correction law implemented by the correction device of the process specified under claim 1, wherein the following operations are carried out in succession:

a) a simulation model of the power train comprising the drivetrain and at least one engine of the machine is formulated theoretically, making it possible to compute a first transfer function for transferring between the speed of rotation of the free turbine, which is filtered with the aid of a predetermined filter, and said preset value NTLpres;

b) the power train is operated while parameters making it possible to tune said first transfer function are measured;

c) an open-loop transfer function is determined by placing the thus-tuned transfer function of the power train and the transfer function of said filter in series;

d) the transfer function of said filter is subtracted from said open-loop transfer function; and e) a corrector is formulated as a replacement for said filter, so as to obtain a correction transfer function which is such that the overall transfer obtained by the placing of the latter function and of the transfer function of the power train in series represents said correction law.

3. The process as claimed in claim 2, wherein an increase in gains is effected on said correction law.

4. A system for controlling the torsional stability of a drivetrain of a helicopter, said helicopter comprising at least a power train including the drivetrain, with a main rotor, an anti-torque rotor as well as gearboxes and associated shafts, and an engine with a free turbine which provides motive energy for driving said main rotor and anti-torque rotor of the drivetrain, said system comprising at least:

a first means for acting on the speed of the turbine engine, as a function of operating commands;

a second means for measuring a speed NTL, corresponding to the speed of rotation of the free turbine of said engine;

a correction device for correcting said measured speed NTL into a corrected value NTLcorr;

third means for determining a preset value NTLpres corresponding to a preset value for the speed of rotation of the free turbine of the engine; and a computation unit for automatically computing, on the basis of said preset value NTLpres and of said corrected value NTLcorr, the operating commands which are applied automatically to said first means, wherein:

said system both controls the torsional stability of the drivetrain and regulates the speed of the turbine engine; said correction device is connected by a link to the second means so as to implement a correction law which corrects said measured speed NTL to obtain, based upon the speed NTL of rotation of the free turbine of said engine transmitted to the correction device by the second means; said correction device outputs the corrected value NTLcorr exhibiting, at least in a frequency domain situated around at least a first torsional mode of said drivetrain, the same modulus as said preset value NTLpres and a phase which is opposite to the phase of said preset value NTLpres in such a way as to damp at least said first torsional mode of the drivetrain.

5. The system as claimed in claim 4, wherein said correction device corrects said measured speed NTL to obtain a corrected value NTLcorr which exhibits the same modulus as said preset value NTLpres and a phase which is opposite to the phase of said preset value NTLpres, in frequency domains situated around a number n of torsional modes of said drivetrain, n being an integer greater than 1.

6. The system as claimed in claim 4, wherein said computation unit and said correction device are incorporated into one and the same computer of a digital type.

7. The system as claimed in claim 4, wherein said correction device is an independent computer.

8. The system as claimed in claim 4, wherein said correction device is an at least partially mechanical means.

* * * * *